(12) United States Patent
Jung et al.

(10) Patent No.: US 9,049,871 B2
(45) Date of Patent: Jun. 9, 2015

(54) BETA-CYCLODEXTRIN IMMOBILIZED ON GLASS AND CHOLESTEROL REMOVAL USING THE SAME

(71) Applicant: Konkuk University Industrial Cooperation Corp., Seoul (KR)

(72) Inventors: Seunho Jung, Seoul (KR); Muhammad Nazir Tahir, Seoul (KR); Seung Ryeoul Paik, Seoul (KR); Daham Jeong, Seoul (KR); Chanho Kwon, Gyeonggi-do (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 0 days.

(21) Appl. No.: 14/256,182

(22) Filed: Apr. 18, 2014

(65) Prior Publication Data

US 2014/0348997 A1    Nov. 27, 2014

(30) Foreign Application Priority Data

May 24, 2013  (KR) .................. 10-2013-0059302

(51) Int. Cl.
| | |
|---|---|
| A23L 1/29 | (2006.01) |
| A23C 9/20 | (2006.01) |
| A23C 7/04 | (2006.01) |
| C03C 17/28 | (2006.01) |
| C03C 15/00 | (2006.01) |

(52) U.S. Cl.
CPC . *A23C 7/04* (2013.01); *C03C 17/28* (2013.01); *C03C 15/00* (2013.01); *C03C 2217/76* (2013.01); *C03C 2218/31* (2013.01)

(58) Field of Classification Search
CPC .... A23C 7/04; C03C 117/28; C03C 2218/31; C03C 2217/76
USPC ................. 426/90, 580, 472, 491, 495
See application file for complete search history.

(56) References Cited

PUBLICATIONS

Kwak et al., "Immobilized ~-Cyclodextrin as a Simple and Recyclable Method for Cholesterol Removal in Milk", Arch Pharm Res, 2004, 27(8), 873-877.
Tahir et al., "Immobilisation of β-Cyclodextrin on Glass: Characterisation and Application for Cholesterol Reduction from Milk", Food Chemistry, 2013, 139, 475-481.

*Primary Examiner* — Helen F Heggestad
(74) *Attorney, Agent, or Firm* — Baker & Hostetler LLP

(57) ABSTRACT

The present disclosure relates to beta-cyclodextrin immobilized on glass manufactured by method comprising: a) synthesizing mono-6-(p-toluenesulfonyl)-6-deoxy-cyclodextrin from beta-cyclodextrin and converting the mono-6-(p-toluenesulfonyl)-6-deoxy-cyclodextrin into β-cyclodextrin-undecenyl ether; and b) etching borosilicate glass and coating the borosilicate glass with the β-cyclodextrin-undecenyl ether and removal of cholesterol from milk using the same.

6 Claims, 6 Drawing Sheets

BETA-CYCLODEXTRIN IMMOBILIZED ON GLASS AND CHOLESTEROL REMOVAL USING THE SAME

CROSS REFERENCE TO RELATED APPLICATIONS

This application is based on and claims priority from Korean Patent Application No. 10-2013-0059302, filed on May 24, 2013, with the Korean Intellectual Property Office, the disclosure of which is incorporated herein in its entirety by reference.

TECHNICAL FIELD

The present disclosure relates to beta-cyclodextrin immobilized on glass and removal of cholesterol from milk using the same.

BACKGROUND

There is a strong connection between a high serum cholesterol level and cardiovascular diseases. Therefore, food companies have carried out many studies for lowering a cholesterol level using physical, chemical, and biological methods. These methods include a method of forming a cholesterol complex by mixing of vegetable oil and adsorption with saponin and digitonin, a method of removal by degradation of cholesterol with a cholesterol oxidizer and extraction of supercritical fluid, and methods of extraction with high-methoxyl pectine and with organic solvents.

There were studies using $\beta$-CD in order to lower cholesterol level of dairy products. However, these studies used $\beta$-CD powder.

Further, 37.41% of cholesterol could be removed from milk using $\beta$-CD immobilized on glass beads (Kwak, H., S. Kim, J. Kim, H. Choi, and J. Kang. 2004. Arch. Pharm. Res. 27(8):873-877).

SUMMARY

The present disclosure has been made in an effort to provide a beta-cyclodextrin complex immobilized on novel glass.

An exemplary embodiment of the present disclosure provides a manufacturing method of glass coated with $\beta$-cyclodextrin-undecenyl ether, the method comprising: a) synthesizing mono-6-(p-toluenesulfonyl)-6-deoxy-cyclodextrin from beta-cyclodextrin and converting the mono-6-(p-toluenesulfonyl)-6-deoxy-cyclodextrin into $\beta$-cyclodextrin-undecenyl ether; and b) etching borosilicate glass and coating the borosilicate glass with the $\beta$-cyclodextrin-undecenyl ether.

According to an exemplary embodiment of the present disclosure, preferably, the conversion is carried out by adding NaH and DMF and then adding 10-undecen-1-ol, but may not be limited thereto.

Another exemplary embodiment of the present disclosure provides glass coated with $\beta$-cyclodextrin-undecenyl ether, the glass manufactured by the manufacturing method according to the present disclosure.

Yet another exemplary embodiment of the present disclosure provides a method for removing cholesterol from a dairy product using the glass coated with $\beta$-cyclodextrin-undecenyl ether according to the present disclosure.

According to an exemplary embodiment of the present disclosure, preferably, the method for removing is carried out in a continuous or batch process, and preferably, the continuous process is carried out on a surface of a micro-reactor or on a spiral column/tube, but may not be limited thereto.

Yet another exemplary embodiment of the present disclosure provides a dairy product in which cholesterol is removed or reduced by the method according to the present disclosure.

According to an exemplary embodiment of the present disclosure, preferably, the dairy product includes milk, yogurt, butter, ice cream, whipping cream, powdered formula, or other dairy products, and more preferably milk, but may not be limited thereto.

Yet another exemplary embodiment of the present disclosure provides a composition for removing cholesterol containing the glass coated with $\beta$-cyclodextrin-undecenyl ether according to the present disclosure.

Hereinafter, the present disclosure will be explained.

In the present disclosure, $\beta$-cyclodextrin ($\beta$-CD) was converted into $\beta$-CD-undecenyl ether (2) by chemical modification and then the $\beta$-CD-undecenyl ether (2) was covalently attached to a glass surface. Such a functionalized glass surface was characterized by a static water contact angle and x-ray photoelectron spectroscopy (XPS). Both of the two techniques confirmed that an excellent monolayer of the $\beta$-CD was formed on the glass surface. A solid-phase surface of the $\beta$-CD was used to lower a cholesterol level in milk. 73.6% of cholesterol was extracted by stirring at 25° C. at 170 rpm for 4 hours. This was the highest value reported for milk using $\beta$-CD immobilized on a solid surface. The same surface was repeatedly used for 10 cycles, and a cholesterol reduction efficiency of 72±2% was maintained in each cycle. XPS analysis carried out after 5 and 10 cycles of reduction in cholesterol showed that the $\beta$-CD on the glass surface was not degraded. High efficiency and long-term stability of a functionalized monolayer are caused by a specific structure of the $\beta$-CD including a length of a long spacer chain providing a great flexibility and a relatively small number of functional groups.

Hereinafter, the present disclosure will be explained in detail.

Immobilization of $\beta$-CD on Glass Surface

Modified $\beta$-CD ($\beta$-CD-undecenyl ether; 2) was covalently attached to a glass surface by a thermal treatment (FIG. 1). Characteristics of a modified surface thereof were investigated by a static water contact angle and XPS. A static water contact angle of etched glass was very low (<15°) due to its highly hydrophobic surface (Nguyen et al., 2011). Attachment of a $\beta$-CD monolayer to the surface reduced hydrophilicity thereof, thereby increasing its static water contact angle from <15° to 54±2°, which suggests successful formation of a $\beta$-CD monolayer.

An XPS wide-scan spectrum (FIG. 2A) shows an increase in amount of C (from 0.00% to 36.87%) and a decrease in amount of O (from 67.24% to 37.70%) and Si (from 32.76% to 25.44%) on a glass slide used in the experiment as compared with blank glass (refer to Table 2). This result suggests that successful attachment of $\beta$-CD-undecenyl ether to a glass surface. In an XPS C1s narrow-scan spectrum (FIG. 2B), signals corresponding to C—C (285 eV) and C—O (286.45 eV) were illustrated in an experimental sample. An agreement in C—O/C—C ratio (theoretical 4.88, experimental 4.31) confirmed that an excellent $\beta$-CD monolayer was formed on a glass surface.

Extraction of Cholesterol from Milk

The inventors of the present disclosure mainly focused on covalent immobilization of $\beta$-CD on a glass surface, detailed characteristics of its modified surface, a change in cholesterol reduction occurring at the modified surface while it was used, and stability of a β-CD monolayer on the glass surface while it was repeatedly used. All of cholesterol extraction experiments were carried out in a glass cell by stirring at 25° C. at 170 rpm.

A cholesterol extraction experiment using β-CD immobilized on a glass surface was carried out in the same manner as described in the example. Samples (Table 1) obtained after 2, 4, 6, and 8 hours were incubated for 4 hours with β-CD immobilized on the glass surface, and there was little change in amount of cholesterol. As a control, a non-modified glass slide was used in a parallel manner under the same conditions. However, a reduction in cholesterol was not observed. Therefore, all of the samples were incubated for 4 hours on a surface modified with the β-CD.

TABLE 1

| Incubation Time (Hrs) | Cholesterol reduction (%) |
|---|---|
| 2 | 71.4 |
| 4 | 73.6 |
| 6 | 73.1 |
| 8 | 73.5 |

Table 1 is a table illustrating an effect of an incubation time on a reduction in cholesterol with β-CD immobilized on a glass surface.

Repeated use of Modified Glass Surface

Cross-linked β-CD could be effectively used for several cycles. However, after extraction of cholesterol, collecting the β-CD from milk is a laborious process and it not easy.

Therefore, this process can be simplified by use of β-CD covalently attached to a solid support such as glass. Further, this process can be used in an industrial-scale continuous process for immobilizing β-CD on a surface of a microreactor or on a spiral column/tube. Due to a repeated use of the surface, the process can be simplified and economical. Importantly, recycling of the modified surface needs to be as simple as possible.

The inventors of the present disclosure developed a method using β-CD covalently attached to a glass surface, and it is possible to easily remove β-CD from milk after extraction of cholesterol and also possible to repeatedly use the β-CD after being immersed in a mixture of acetic acid and butanol. The inventors of the present disclosure used the modified glass surface of the present disclosure 10 times for extraction of cholesterol from milk, and according to an HPLC result (FIG. 3), there was little difference in cholesterol reduction over time. At a $10^{th}$ cycle, 72±2% of cholesterol was extracted from milk using the same glass surface functionalized with β-CD. During the repeated use, a change in cholesterol reduction was not observed after 4 hours during a preparatory experiment (Table 1). Therefore, an incubation time was 4 hours. Characteristics of the glass surface modified with the β-CD were investigated by a static water contact angle and XPS (FIG. 2). According to XPS spectra (FIG. 4A) on the same surface on which repeated use of 5 and 10 cycles was recorded, there was little change in a relative number of specific bond couplings or in basic composition. An insignificant increase in amount of Si and O and a slight decrease in amount of C were observed (Table 2). Therefore, it can be considered that the surface is stable under the conditions used in the present disclosure.

Interestingly, experimental values of various other bond couplings on a newly modified surface were slightly deviated from theoretical values (Table 2). This deviation was decreased after 5 cycles and approximately equivalent to the theoretical values after 10 cycles. A cause of the variable was presence of an undesirable signal in a C1s narrow-scan spectrum on the newly modified surface at 289.05 eV (FIG. 2B). An XPS spectrum recorded after the $10^{th}$ cycle not only confirms removal of by-products but also suggests stability of a monolayer on the glass surface during the repeated use. Therefore, non-presence of unnecessary functional groups and a long alkyl chain at a monolayer (FIG. 1) of the present disclosure are major causes of excellent efficiency, long-term stability, and durability of the present disclosure.

TABLE 2

| Substrate | Elemental Comp. Atomic %)* | | | C—C bond | | C—O bond | |
|---|---|---|---|---|---|---|---|
| | Si | O | C | Ther. | Expt. | Ther. | Expt. |
| Blank glass (Before modification) | 32.76 | 67.24 | 0.00 | | | | |
| Glass modified with β-CD-undecenyl ether (3) | 25.44 | 37.70 | 36.87 | 9 | 9.17 | 44 | 39.57 |
| Modified surface (3) after treating with milk (after 5 cycles) | 26.57 | 40.44 | 32.98 | 9 | 9.03 | 44 | 41.88 |
| Modified surface (3) after treating with milk (after 10 cycles) | 25.80 | 41.64 | 32.55 | 9 | 8.82 | 44 | 44.18 |

*Data obtained from XPS measurements

Table 2 is a table illustrating elemental composition of blank clean glass before and after modification with β-CD-undecenyl ether (3) of the present disclosure.

β-CD immobilized on a glass surface was used as a solid support for reducing cholesterol from milk. XPS and a modified glass surface by a static water contact confirmed successful modification of the glass surface. A value of cholesterol reduction (72±2%) observed in the present disclosure is the highest value among the reported documents using immobilized β-CD. Further, the present disclosure enables easy isolation, repeated use, long-term stability, and application of such a modified surface to an industrial-scale continuous process.

According to the exemplary embodiments of the present disclosure, an alkene-based monolayer reported in the present invention and having minimum functional group for avoiding unnecessary interactions between molecules or within molecules and a relatively long carbon chain is stable and can be repeatedly used for many cycles without loss of efficiency and can also be stored for a long time without degradation.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF ILLUSTRATIVE EMBODIMENTS

Figure 1:
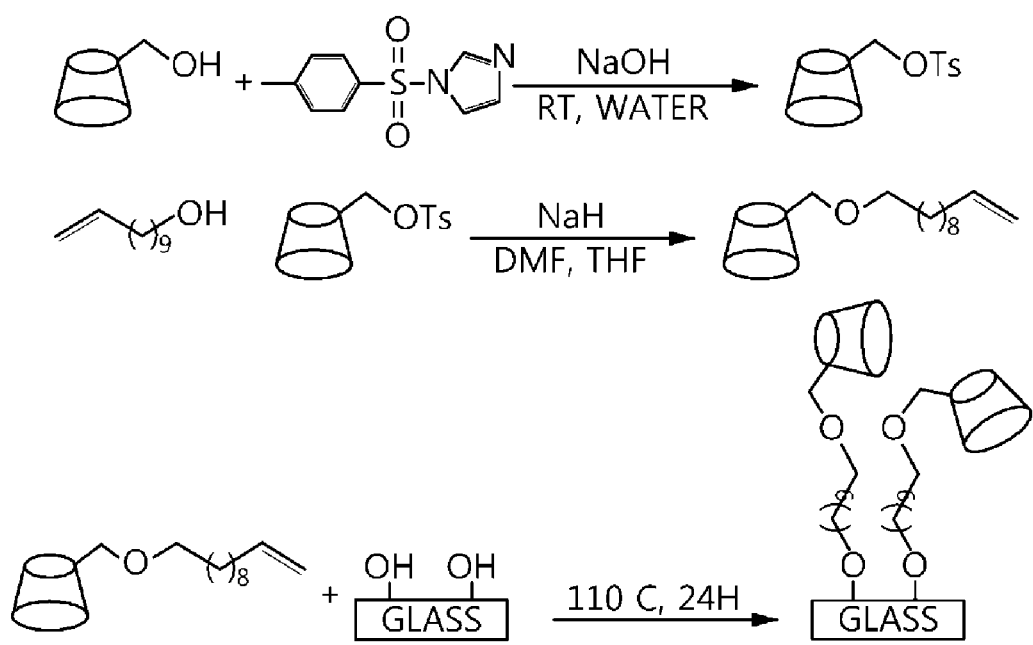
FIG. 1 illustrates a modification process of a glass slide with modified β-CD.
Figure 2A:
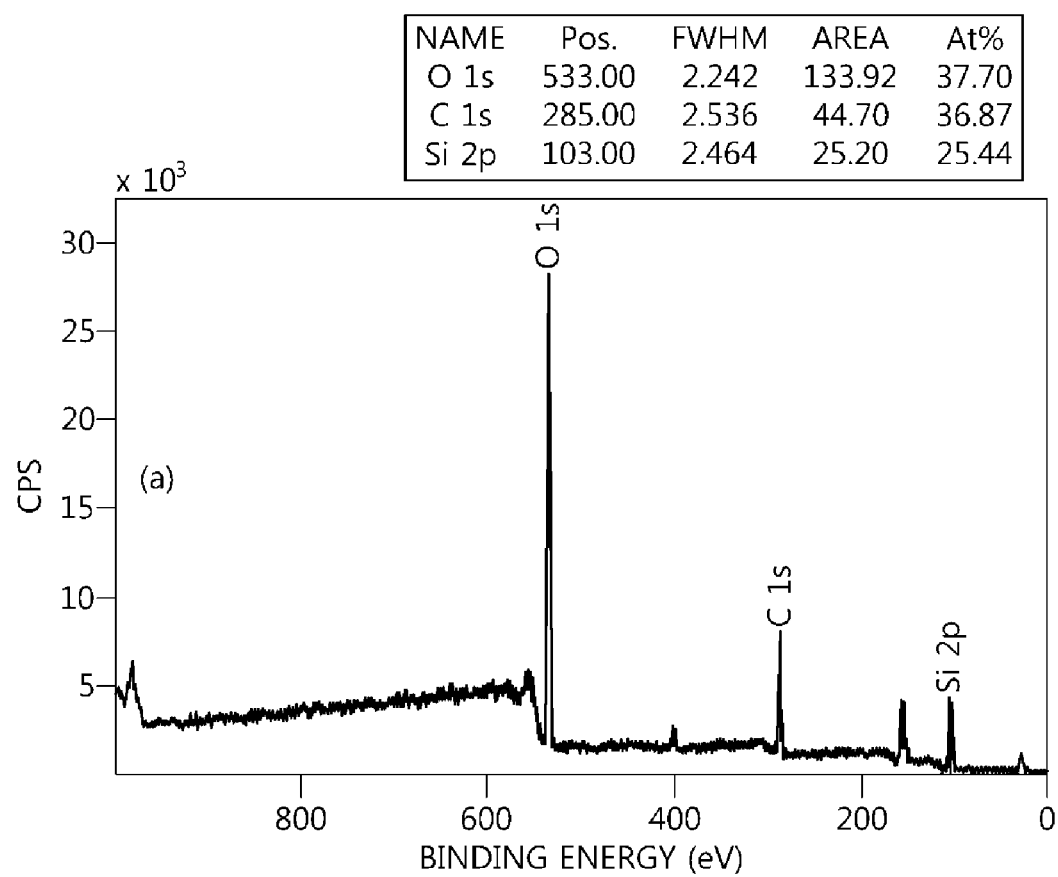
FIGS. 2A and B illustrate XPS spectrum on a glass surface modified with β-CD (A: wide-scan, B: C1s narrow-scan).
Figure 2B:
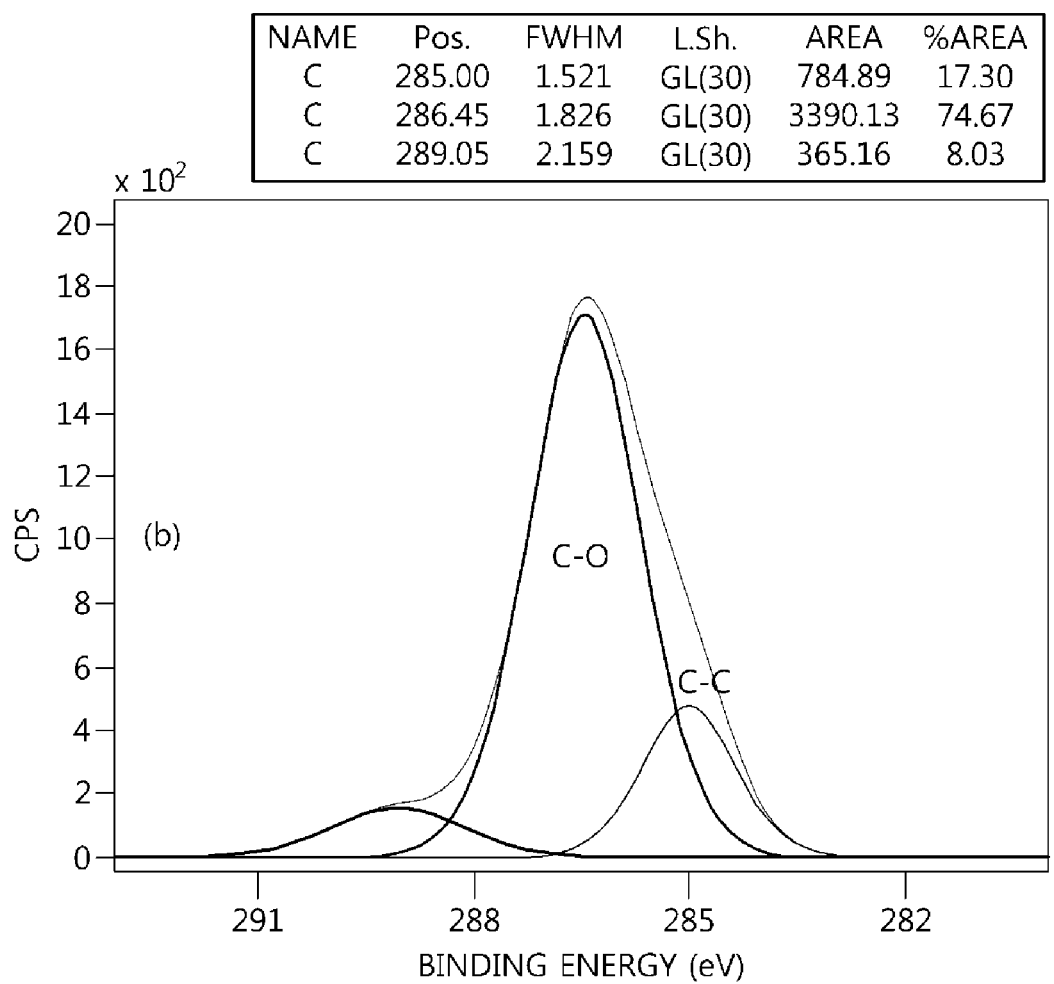
Figure 3:
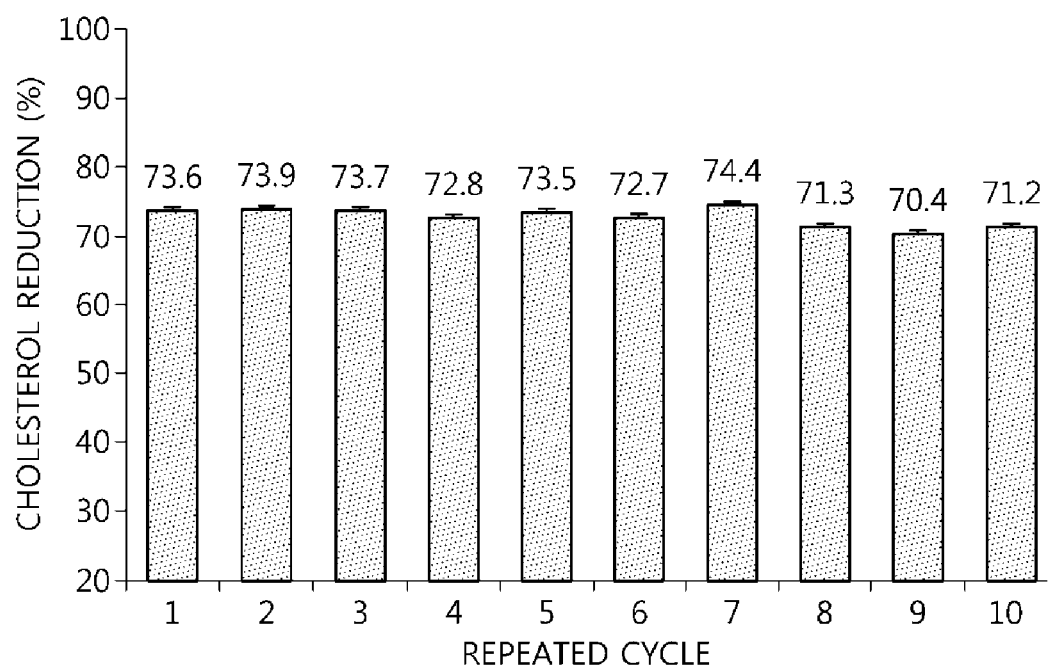
FIG. 3 illustrates a reduction in cholesterol from milk due to repeated use of β-CD immobilized on glass.
Figure 4A:
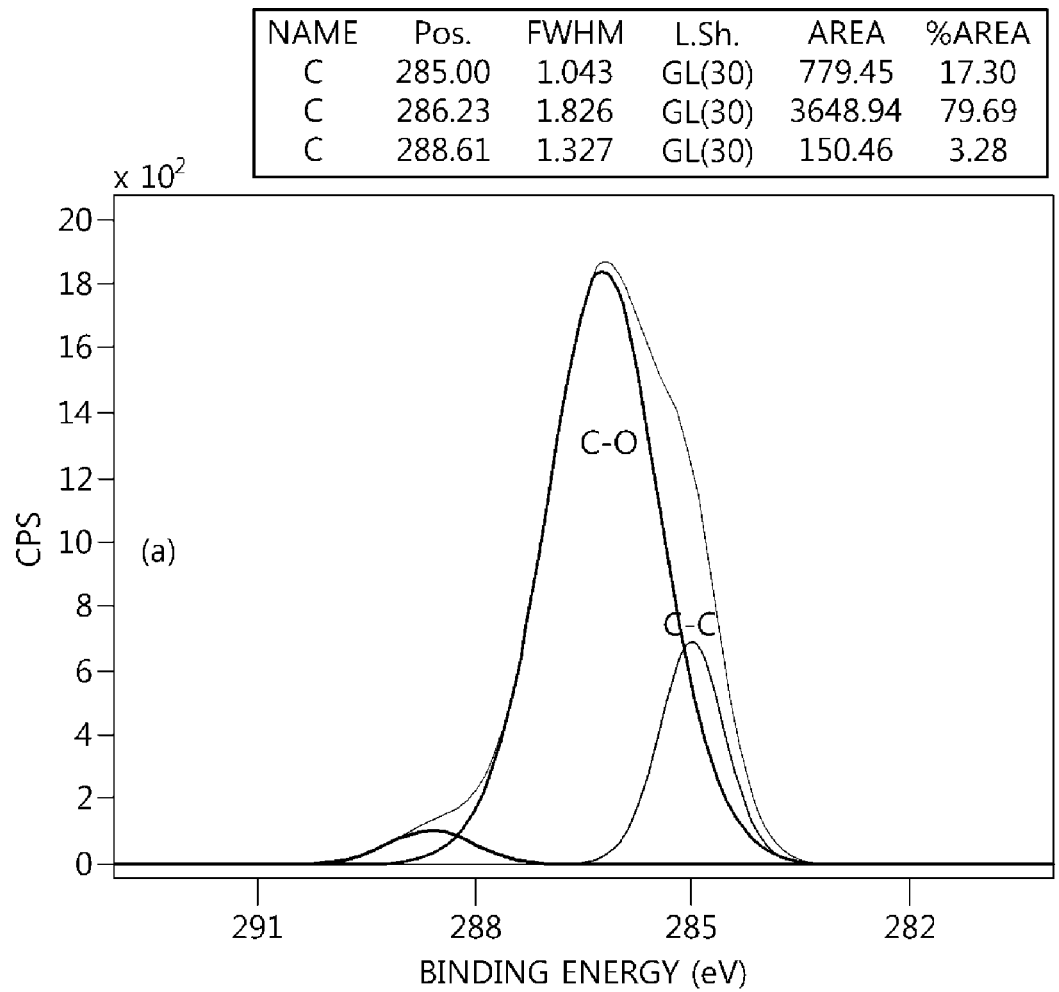
FIGS. 4A and B illustrate spectrum on a glass surface modified with β-CD (3) after 5 cycles (A) and after 10 cycles (B) of a reduction in cholesterol from milk.
Figure 4B:
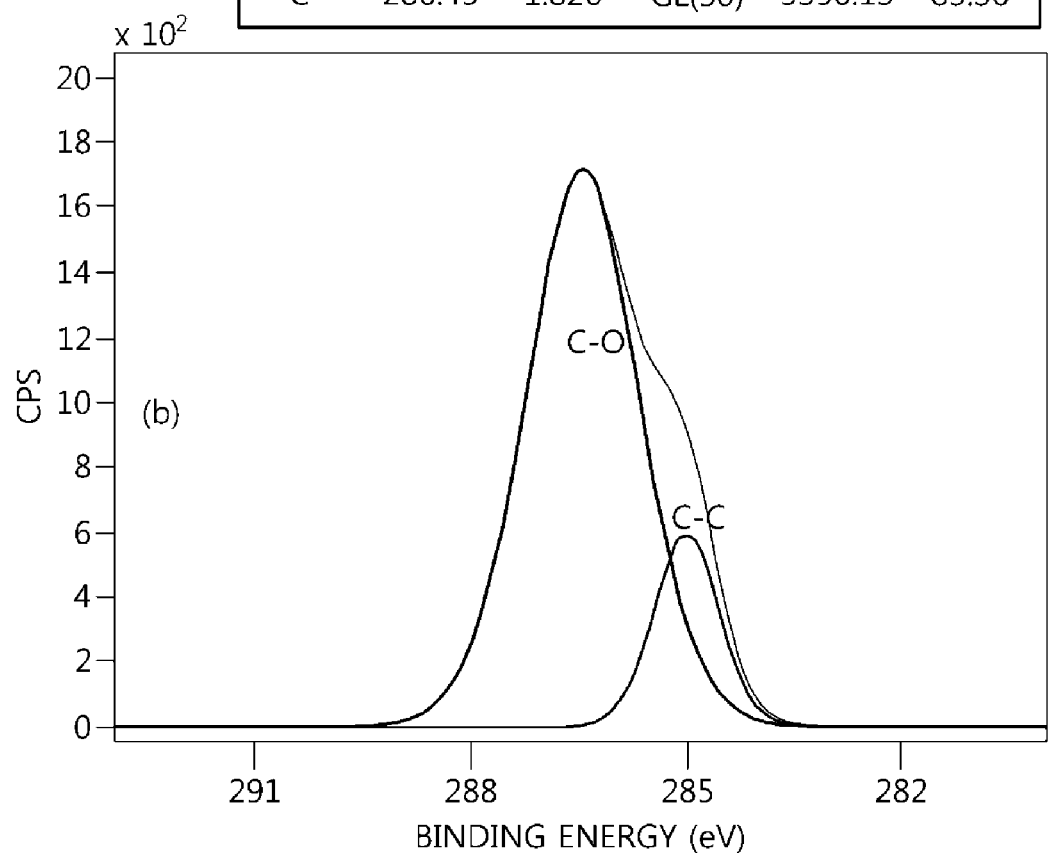

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Standard milk used in the present disclosure was purchased from a convenience store, and β-CD (≥97%), ammonium chloride, 1-(p-toluenesulfonyl)-imidazole, and tetrahydrofuran (THF) were purchased from Sigma-Aldrich. N,N-dimethyl formamide (DMF) was purchased from Fluka, 10-undecen-1-ol and sodium hydride were purchased from Tokyo Chemical Industry, sodium hydroxide was purchased from Duksan, and DMSO-d6 was purchased from Cambridge Isotope Laboratories, Inc. (USA). A glass microscope slide (76× 26×1 mm) was purchased from Paul Marienfeld GmbH & Co.KG (lauda-konigshofen, Germany).

All water used was purified by using a Direct-Q Millipore water purification system purchased from Sam Woo S&T Co., Ltd. (Korea). The β-CD was dried in a vacuum until a certain weight was measured, and the other chemicals were used without additional purification. An NMR spectrum was recorded on a Bruker AMX spectrometer at 500 MHz. TLC (Thin layer chromatography) was carried out on a Merck Kieselgel 60 F254 plate. TLC spots were exposed to 5% sulfuric acid-ethanol at 140° C. to be visible to the naked eye. An XPS spectrum was recorded by using a Sigma Probe (ThermoVG, UK) photoelectron spectrometer. High-resolution spectrum were obtained by using analyzer pass energy of 20 eV (0.1 eV step size) for narrow-scans and 50 eV (1.0 eV step size) for wide-scans and monochromatic Al-Kα X-ray radiation of 15 kV and 100 W. All of the high-resolution spectra were corrected with a linear background before fitting. Wettability of a modified surface was determined by automatically measuring a static water contact angle with a Kruss DSA 10 Mk2 contact angle goniometer. A volume of drops of mineral-removed water was 3 μL.

Example 1

Synthesis of β-cyclodextrin-undecenyl ether

Mono-6-(p-toluenesulfonyl)-6-deoxy-cyclodextrin (β-CD-OTs, 1) was synthesized from β-CD in the same manner as described in Wang et al., 2011 and then converted into β-cyclodextrin-undecenyl ether (β-CD-undecenyl ether, 2). To do so, NaH (100 mg, 60% dispersion in mineral oil, 2.50 mmol) was washed with pentane several times, and then dry DMF (4 mL) was added to a round-bottom flask dried in a nitrogen environment. Then, 10-undecen-1-ol (0.34 g, 2 mmol) in dry THF (4 mL) was dropwise added into the flask maintained at 0° C. After 5 hours, $H_2$ evolution was completed, and then β-CD-OTs (1; 1 g, 0.77 mmol) dissolved in dry DMF (4 mL) was slowly added. The reaction was carried out with stirring all through the night in a nitrogen environment. Thereafter, the reaction was stopped with water (10 mL). Unreacted 10-undecen-1-ol was mixed with diethyl ether (3×10 mL) and extracted together and then isolated. A water phase including the product was dried in a vacuum, and the product was purified by means of flash column chromatography (i-Pr-OH: H2O: EtOAc: NH4OH/5:5:1:1), 823.84 mg, 0.64 mmol, 82%. TLC Rf: 0.63 (i-Pr-OH: H2O: EtOAc: NH4OH/5:5:1:1), 1-H NMR (500 MHz, DMSO-d6) δ=1.29 (s, 10H), 1.43 (m, 2H), 1.51 (m, 2H), 2.18 (m, 2H), 3.31.3.61 (m, 40H), 3.37 (m, 2H), 4.13 (m, 1H), 4.27.4.29 (m, 1H), 4.33 (t, 1H), 4.41 (m, 2H), 4.48 (t, 3H), 4.72 (d, 2H), 4.80 (m, 5H), 5.02 (m, 2H), 5.64.5.73 (m, 14H), 5.82 (m, 1H).

Example 2

Modification of Borosilicate Micro-Glass Slide

A borosilicate glass microscope slide was washed with acetone, n-hexane, methanol, and ethanol (3 times per solvent) and sonicated for 5 minutes per solvent. All of the solvents were HPLC grade. The glass slide was etched in a freshly prepared solution of HCl (37%) and ethanol (1:1 v/v) for 30 minutes. After etching, the sample was rinsed and sonicated with deionized water and ethanol for 5 minutes per solvent and then dried under a nitrogen stream. Immediately after washing, the glass slide was transferred to a glass reaction cell. Before the glass slide was tightly sealed, it was coated with β-CD-undecenyl ether (2) dissolved in DMSO (30 mg/mL) with a micropipet in a nitrogen environment. The reaction cell was immersed in liquid nitrogen to freeze the β-CD-undecenyl ether (2) and then liquefy the β-CD-undecenyl ether (2) in a vacuum at room temperature. This freezing and thawing cycle was repeated 3 times to remove a small amount of oxygen and moisture which might be introduced into the reaction cell while the sample was coated. Finally, the reaction cell was recharged with nitrogen and immersed in a silicon oil bath and then heated at 110° C. for 24 hours while maintaining a nitrogen pressure. The modified glass slide (3) was removed from the reaction cell and sufficiently washed with deionized water, n-hexane, and acetone and then sonicated for 5 minutes per solvent. Thereafter, the modified glass slide was dried under a nitrogen stream, and characteristics thereof were investigated by a static water contact angle and XPS. Regeneration of the reaction was confirmed by recording an XPS spectrum on a manufactured glass surface 3 times independently.

Example 3

Extraction of Cholesterol from Milk and HPLC Analysis

A glass surface modified with β-CD was positioned in a glass cell. A glass slide and milk having a volume equivalent to a weight of the glass slide were added to the cell and tightly attached and then positioned in a stirrer at 25° C. and 170 rpm. The same process was carried out with a non-modified glass slide of the same type as a control. Samples were obtained after 2, 4, 6, and 8 hours. For cholesterol crystals, the β-CD-treated milk (1 mL) was transferred to a test tube and then mixed with 10% KOH (ethanolic; 1 mL). The test tube was tightly sealed and heated at 70° C. for 30 minutes, thereby completing saponification. After cooling at room temperature, 3 mL of water was added, and non-saponified fractions were extracted with n-hexane (3×5 mL). Organic layers were collected and distilled in a vacuum. Residues were redissolved in methanol (1 mL) and HPLC-analyzed. As a control, 1 mL of non-treated milk was used, and the same process was carried out in a parallel manner.

Jupiter C18 HPLC column (5 μM, 250×4.60 mm) (Shimadzu, Japan) was used for quantitative analysis of cholesterol by a method developed by Oh, H. I., T. S. Shin, and E. J. Chang. 2001. Determination of Cholesterol in Milk and Dairy Products by High-Performance Liquid Chromatography. Asian-Aust. J. Anim. Sci. 14:1465-1469. The analysis was carried out at 30° C. at a flow rate of 1.5 mL/min, and a mobile phase was acetonitrile:isopropanol (89:11 v/v). Elution was monitored at 205 nm. For quantitative analysis, a cholesterol solution having a different concentration was run by HPLC under the same conditions, and a straight line was drawn between the concentration and a peak area (R2=0.992).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed:

1. A method of manufacturing glass coated with β-cyclodextrin-undecenyl ether comprising:
   a) synthesizing mono-6-(p-toluenesulfonyl)-6-deoxy-cyclodextrin from beta-cyclodextrin and converting the mono-6-(p-toluenesulfonyl)-6-deoxy-cyclodextrin into β-cyclodextrin-undecenyl ether; and
   b) etching borosilicate glass and coating the borosilicate glass with the β-cyclodextrin-undecenyl ether.

2. The method of manufacturing glass coated with β-cyclodextrin-undecenyl ether of claim 1, wherein the conversion step is carried out by adding NaH and DMF and then adding 10-undecen-1-ol.

3. Glass coated with β-cyclodextrin-undecenyl ether, wherein the glass is manufactured by the manufacturing method according to claim 1.

4. A method for removing cholesterol from a dairy product comprising contacting the glass coated with β-cyclodextrin-undecenyl ether according to claim 3 with said dairy product.

5. The method of claim 4, wherein the method for removing cholesterol from a dairy product is carried out in a continuous or batch process.

6. The method of claim 5, wherein the continuous process is carried out on a surface of a micro-reactor or on a spiral column/tube.

* * * * *